Dec. 30, 1924.  
E. E. PLASTERS  
DISHWASHER  
Filed Feb. 15, 1924    2 Sheets-Sheet 1  
1,521,124
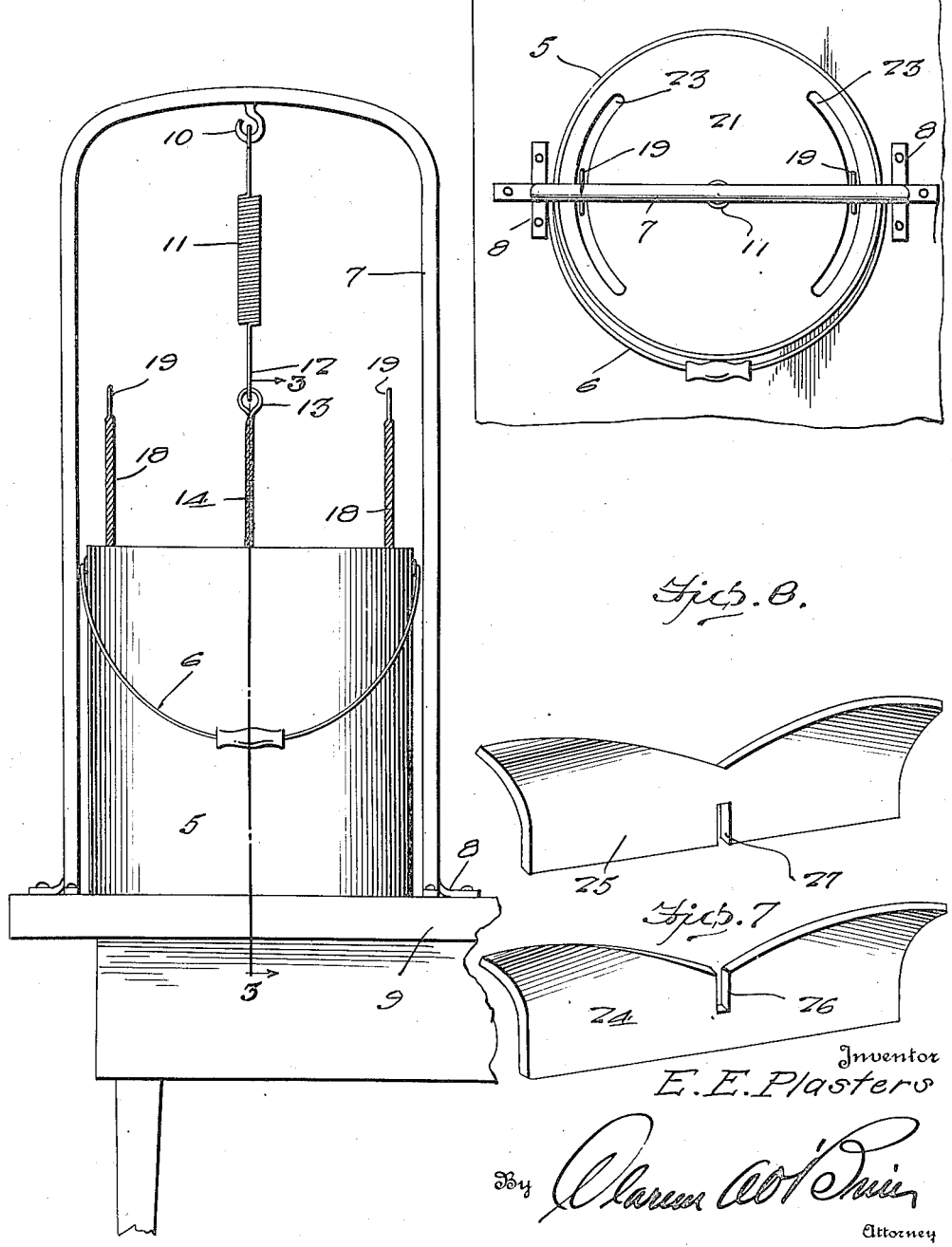
Inventor  
E. E. Plasters

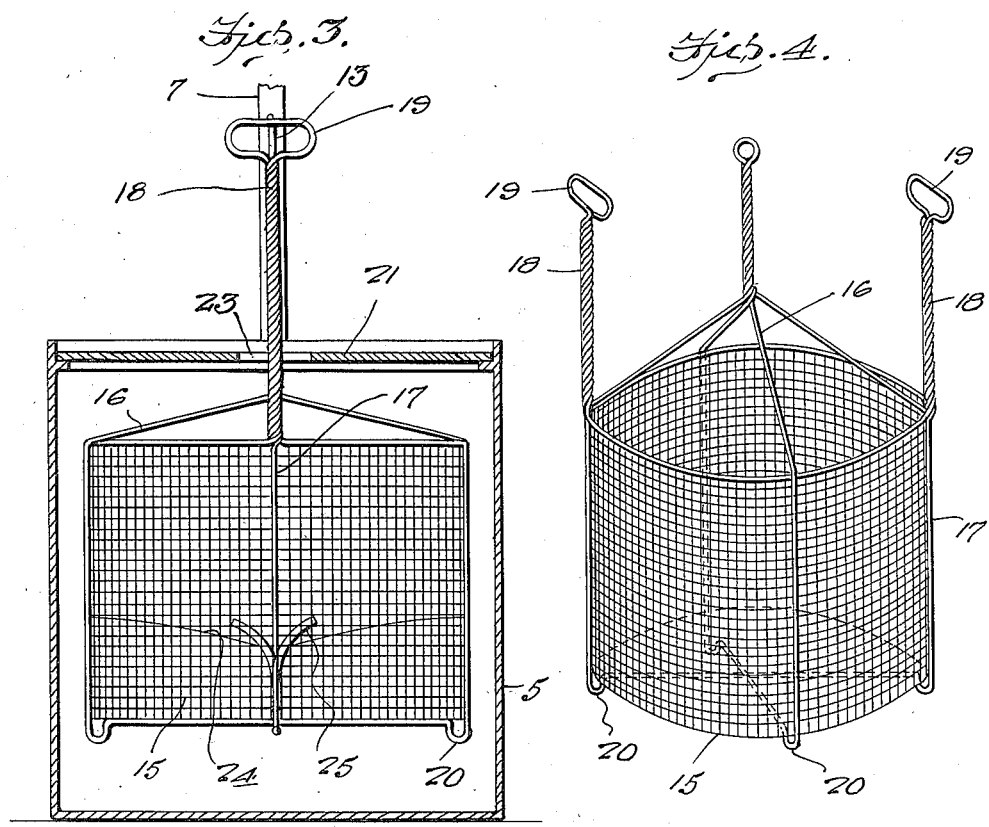
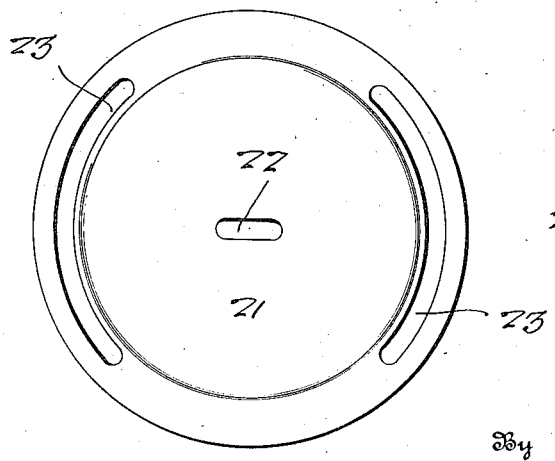
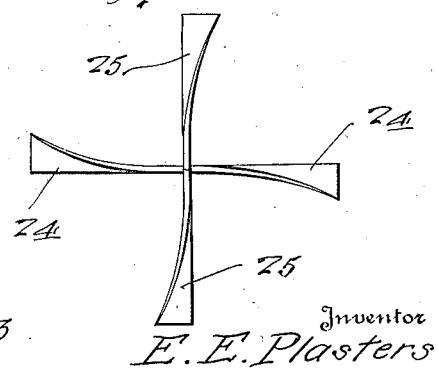

Patented Dec. 30, 1924.

1,521,124

UNITED STATES PATENT OFFICE.

EMMA E. PLASTERS, OF HYATTVILLE, WYOMING.

DISHWASHER.

Application filed February 15, 1924. Serial No. 693,033.

*To all whom it may concern:*

Be it known that I, EMMA E. PLASTERS, a citizen of the United States, residing at Hyattville, in the county of Big Horn and State of Wyoming, have invented certain new and useful Improvements in Dishwashers, of which the following is a specification.

This invention relates to that class of dishwashers wherein a foraminous dish receptacle is provided and associated with a water receptacle, into which the dish receptacle is adapted to be placed.

The primary object of the invention is to provide a dish washer of the above kind in which the dish receptacle is adapted to be vertically reciprocated and also given a horizontal reciprocatory rotary motion for causing the water to pass in and out of the dish receptacle vertically and horizontally in opposite directions and by its consequent contact with the dishes in these directions to effectively cleanse them.

Another object of the invention is to provide a dish washer of the above mentioned character which is simple in construction, inexpensive to manufacture, and reliable in operation.

Still another object of the invention is to provide the dish receptacle with improved means for deflecting and assisting in the agitating of the water that passes therethrough.

A further object of the invention is to provide a dish washer of the above character wherein the dish receptacle is maintained entirely within the water receptacle during the washing operation, and wherein the water receptacle is effectively closed during such washing operation for preventing splashing of the water out of the water receptacle.

Other objects will appear as the nature of the invention is better understood, and the same consists in the novel form, combination, and arrangement of parts hereinafter more fully described, shown in the accompanying drawings and claimed.

In the drawings wherein like reference characters designate corresponding parts throughout the several views:

Figure 1 is an elevational view of a dish washer constructed in accordance with the present invention, and shown operatively applied upon a table.

Figure 2 is a fragmentary top plan view of the device shown in Figure 1.

Figure 3 is a vertical sectional view taken substantially upon the line 3—3 of Figure 1 the basket being shown in elevation but showing a section of the cover through slot 23.

Figure 4 is a perspective view of the dish receptacle.

Figure 5 is a top plan view of the water receptacle cover.

Figure 6 is a top plan view of the water agitator or deflector of the dish receptacle.

Figure 7 is a perspective view of one member of the device shown in Figure 6, and Figure 8 is a view similar to Figure 7 of the other member thereof.

Referring more in detail to the drawings, 5 indicates preferably cylindrical water receptacle adapted to receive therein a suitable quantity of cleansing agents, such as hot water having a suitable amount of soap in solution to facilitate the removal of dirt or grease from the dishes desired to be cleansed. This water receptacle is provided with a suitable bail or handle 6 for facilitating carrying of the same.

The invention further embodies an inverted substantially U-shaped supporting member 7 that is adapted to be rigidly secured to a suitable support, so as to assume a vertical position as shown, by the provision of suitable securing flanges 8 upon the lower ends of the depending arms of said supporting members 7, adapted to be bolted or otherwise secured to said supporting surface which is herein illustrated, by way of example, as the top 9 of a table. The vertical or depending arms of the supporting member 7 are spaced apart sufficiently to permit disposal of the water receptacle 5 therebetween, and fixed to the intermediate portion of the supporting member 7 is a depending hook 10 which, when the receptacle 5 is properly disposed, will occupy a position directly over the center of said receptacle 5. A retractor or tension spring 11 of spiral form is suspended from the hook 10 and has its lower end formed with a hook 12 adapted to engage in an eye 13 formed upon the upper end of a member 14 carried by the dish receptacle 15 for supporting the latter within the water receptacle 5 so that said dish receptacle normally occupies a position spaced from and above the bottom of the water receptacle 5 as shown in Figure 3. This receptacle 15 is of a shape similar to that of the water receptacle 5, but is of such a size that it will fit loosely within the water receptacle so as to leave a material space within the receptacle 5 above and below and about the dish receptacle, thus permitting vertical reciprocation of the dish receptacle 15 while entirely disposed within the water receptacle 5 and at the same time permitting the top of the water receptacle 5 to be maintained in a closed condition. This construction also permits free passage of water entirely through the dish receptacle in all directions, as the dish receptacle is entirely out of contact with and spaced from the water receptacle when in use. The dish receptacle 15 is preferably formed of screen material for cheapness and lightness of construction as shown, and the member 14 is disposed coincident with the vertical axis of said dish receptacle and formed by twisting together the free end portions of cross wire frames 16 and 17 in which the dish receptacle 15 is disposed and retained. The frames 16 and 17 cross centrally of the bottom of the receptacle 15 and extend across the bottom of the latter and up the sides thereof. The wire frame 17 is twisted at the upper edge of the receptacle 15 to provide opposed upwardly extending handles 18, having hand holds upon their free upper ends as at 19, after which the end portions of the frame 17 are extended inwardly from the lower ends of the handles 18 in upwardly converging relation for meeting the upwardly converging end portions of the frame 16 and being twisted together therewith to form the member 14 as shown more clearly in Figure 4.

It is to be noted that the dish receptacle 15 is to be removed from the water receptacle 5 at the completion of the washing operation, so as to remove the dishes that have been washed and for facilitating draining of the dishes at this time, the same may be left in the receptacle 15 and the latter placed upon a suitable drain board or the like. The frames 16 and 17 are provided with downwardly offset portions 20 forming supporting seats for the dish receptacle 15 and by means of which the bottom wall of said receptacle 15 is maintained in spaced relation to and above the drain board or the like for permitting the free passage of water out of the receptacle 15 as it drains from the dishes, the offset portions 20 being disposed at the bottom edges of the circular wall of the receptacle 15 as shown more clearly in Figures 3 and 4.

It is noted that the spring 11 does not provide means for raising the dish receptacle upwardly out of or partially out of the water receptacle 5, but forms a resilient or elastic support for suspending the dish receptacle entirely within the water receptacle 5 as shown clearly in Figure 3, with the dish receptacle capable of upward or downward movement while the top of the water receptacle 5 is maintained closed. It is further noted that upon slight pressure in a downward direction upon the dish receptacle 15 by manipulation of the handles 18, the spring 11 will be stretched or placed under tension, and when this pressure is relieved the spring 11 will act to return the dish receptacle upwardly past its normal position. Thus, no manual power is exerted in lifting the dish receptacle after it has been depressed for stretching or placing the spring 11 under tension.

The top of the water receptacle 5 is adapted to be closed by means of a removable lid or cover 21 that is provided with a central opening 22, and marginal concentric arcuate slots 23, the central opening 22 being in the form of a transversely elongated slot that extends in a direction substantially transverse to the longitudinal axes of the slots 23. The member 14 of the dish receptacle frame is adapted to extend upwardly through the opening 22, while the handles 18 are disposed to project upwardly through the arcuate slots 23 of the cover 21. Due to the form of the slot 23, it is apparent that the dish receptacle may be given an oscillatory rotary motion about its vertical axis without disturbing the cover 21, while free vertical reciprocation of the dish receptacle is also permitted. In addition to this, the elongated form of the slot 22 permits of lateral tilting of the dish receptacle while it is being given the vertical reciprocatory and oscillating rotary motions, thus permitting a substantially universal movement of the floating dish receptacle within the water receptacle. This results in causing the water to be thrown and forced through the dish receptacle in substantially all directions, so that a maximum cleaning efficiency is insured. At the same time, the dish receptacle is constantly maintained within the water receptacle 5, while it is closed at its upper end by the cover 21, thus preventing the splashing of water out of the water receptacle, which is obviously objectionable.

In order to increase the agitation of the cleansing agent, during the manipulation of the dish receptacle, I provide the latter with an agitator or deflector composed of a plurality of radial wings, the upper portions of which are deflected laterally in opposite directions. This agitator or deflector is preferably constructed of a pair of members respectively indicated at 24 and 25 that are centrally crossed when disposed at right angles to each other and formed for interlocking engagement with each other at their crossing points. The interlocking engagement is effected by providing the member 24 with a transverse slot 26 that extends downwardly from the upper edge of said member 24 for a distance substantially equal to onehalf of the height of the latter, and by providing the member 25 with a similar slot 27 that extends upwardly from the lower edge of the member 25 for a similar distance. The resultant agitator embodies four wings of equal length and is of a form to be snugly fitted into the dish receptacle to rest upon the bottom wall thereof and with the outer end edges of the wings engaged with the cylindrical wall of the receptacle 15 as indicated at Figure 3. This agitator is placed in the dish receptacle prior to the placing of the dishes therein, and more effective cleansing operation can be obtained by avoiding stacking of dishes which would obviously result in preventing contact of the fluid with the greater portions of the surfaces thereof.

Obviously any supplemental means may be attached to the hand hold 19 for permitting operation of the dish receptacle from a distance or for permitting operation thereof should the device be placed upon the floor, thus rendering it unnecessary for the operator to assume a crouching or stooped position at this time. It is also apparent that the depending arms of the supporting member 7 might be rigidly secured at their lower ends against the opposite sides of the water receptacle 5 without departing from the spirit of the invention. However, the supporting member 7 is preferably made separate from the receptacle 5 so that the latter may be readily manipulated for placing the cleansing agent therein or removing the same therefrom.

The cleansing agent is placed into the receptacle 5, preferably to a level so as to completely cover the dishes when the dish receptacle 15 is normally positioned as shown in Figure 3, and, upon manipulation of the dish receptacle as above noted, effective cleansing of the dishes will be obtained.

From the foregoing description, it is believed that the construction and operation as well as the advantages of the present invention will be readily understood and appreciated by those skilled in the art.

What I claim as new is:

A dish washer of the character described comprising a water receptacle, a foraminous dish receptacle adapted to be disposed within the water receptacle, said dish receptacle being of a size to assume a position within the water receptacle below the top and above the bottom of the latter as well as spaced from the sides thereof, means including a retractile spring for suspending the dish receptacle within the water receptacle in its said position, handles projecting upwardly from and rigid with the opposite sides of the dish receptacle for facilitating manual vertical reciprocation and rotary oscillating movement of the dish receptacle about a vertical axis, a cover for the top of said water receptacle having openings through which the handles project, said openings being of arcuate elongated form to permit the rotary oscillating movement of the dish receptacle, said dish receptacle having a rigid arm disposed above the top thereof and coincident with its vertical axis, said cover having a central opening through which said arm projects for attachment to said spring, said central opening of the cover being transversely elongated to permit lateral tilting of the dish receptacle.

In testimony whereof I affix my signature.

EMMA E. PLASTERS.